(12) United States Patent
Fan

(10) Patent No.: US 11,476,882 B2
(45) Date of Patent: Oct. 18, 2022

(54) FASTENING DEVICE WITH PROTECTION SHEATH FOR PORTABLE ELECTRONIC DEVICE

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 217 days.

(21) Appl. No.: 17/030,106

(22) Filed: Sep. 23, 2020

(65) Prior Publication Data

US 2022/0094380 A1 Mar. 24, 2022

(51) Int. Cl.
*H04B 1/3877* (2015.01)
*A44B 11/20* (2006.01)
*A44B 11/00* (2006.01)

(52) U.S. Cl.
CPC .......... *H04B 1/3877* (2013.01); *A44B 11/005* (2013.01); *A44B 11/20* (2013.01)

(58) Field of Classification Search
CPC ...... H04B 1/3877; A44B 11/005; A44B 11/20
See application file for complete search history.

(56) References Cited

U.S. PATENT DOCUMENTS

| 2016/0373152 | A1* | 12/2016 | Schmidt | F16M 11/105 |
| 2019/0243419 | A1* | 8/2019 | Charlesworth | A45C 11/00 |
| 2021/0085064 | A1* | 3/2021 | Khalsa | H04M 1/04 |

* cited by examiner

*Primary Examiner* — Lester G Kincaid
*Assistant Examiner* — Maryam Soltanzadeh
(74) *Attorney, Agent, or Firm* — Lin & Associates Intellectual Property, Inc.

(57) ABSTRACT

A fastening device with protection sheath for portable electronic device is provided, including an elastic protection sheath, a connecting accessory and a strap; the elastic protection sheath being stretchable to increase size for accommodating and fixing a portable electronic device, the connecting accessory being disposed on the elastic protection sheath and located on the second surface, the connecting accessory being disposed with a rotatable arc-shaped bracket with a protruding hook and a positioning element disposed respectively at the two ends of the arc; the strap being elastic and stretchable, and having a limiting hole and a plurality of buckle holes, the strap being sheathed on the position element by the limiting hole and the protruding hook being inserted into one of the buckle holes, the bracket and the strap being used to wrap and tighten around a carrier to be fastened to.

5 Claims, 8 Drawing Sheets

FASTENING DEVICE WITH PROTECTION SHEATH FOR PORTABLE ELECTRONIC DEVICE

BACKGROUND OF THE INVENTION

1. Field of the Invention

The present invention relates generally to a protection sheath for portable electronic device, and more particularly, to provide a fastening device to mount the protection sheath for portable electronic device on bicycles and motorcycles.

2. The Prior Arts

As outdoor sports are prevailing, portable electronic devices have become indispensable in daily life, such as mobile phones, GPS, etc., which help users to navigate freely in unfamiliar environments on bicycles, motorcycles and other carriers to enjoy the pleasant ride in nature. Therefore, the user needs a fastening device to fast and conveniently mount the portable electronic device on the bicycle or motorcycle, to make the use of the portable electronic device more convenient.

SUMMARY OF THE INVENTION

In order to solve the above problem, the primary object of the present invention is to provide a fastening device with protection sheath for a portable electronic device.

To achieve the aforementioned object, the present adopts the following technical solutions:

The fastening device with protection sheath for portable electronic device of the present invention includes an elastic protection sheath, a connecting accessory and a strap; the elastic protection sheath being stretchable to increase accommodation size, and comprising a supporting area, a plurality of elastic strips and a plurality of corner protection nets, all formed monolithically; the supporting area having a first surface and a second surface, opposite to each other; the first surface being for placing a portable electronic device, the corner protection nets being connected to the supporting area through elastic strips, the corner protection nets buckling on the four corners of the portable electronic device with a tightness maintained by the elastic strips when fastened; the connecting accessory being disposed on the elastic protection sheath and located on the side of the second surface, the connecting accessory being disposed with a rotatable arc-shaped bracket with a protruding hook and a positioning element disposed respectively at the two ends of the arc; the strap being elastic and stretchable, and having a limiting hole and a plurality of buckle holes, the strap being sheathed on the position element by the limiting hole and the protruding hook being inserted into one of the buckle holes, the bracket and the strap being used to wrap and tighten around a carrier to be fastened to.

In a preferred embodiment, the supporting area has a first hole, a middle position of the bracket has a second hole, the connecting accessory further includes an embedding element and a locking element, the embedding element and the bracket are respectively located on the first surface and the second surface of the supporting area, the locking element is locked to the embedding element through the second hole and the first hole, the locking element limits the position of the bracket without hindering the rotation of the bracket.

In a preferred embodiment, the supporting area further forms a recess at the first surface, the embedding element is disposed in the recess, and the first hole penetrates the recess.

In a preferred embodiment, the recess is further formed with a plurality of recessed limiting grooves, the embedding element has a plurality of convex ribs facing the direction of the recess, and the convex ribs are located in the limiting grooves after assembly.

In a preferred embodiment, the embedding element has a docking portion, the docking portion has a screw hole in the center, the bracket has a shaft, and the second hole penetrates the center of the shaft, the docking portion is docked with the shaft when assembled, and the locking element is a screw that passes through the second hole and then locks in the screw hole, so that the bracket can be rotated but not separated from embedding element.

In a preferred embodiment, the corner protection net is a three-dimensional raised net protruding from the first surface.

In a preferred embodiment, the elastic strip is in the shape of a strip or a net.

In a preferred embodiment, the strap has an anti-slip section located between the limiting hole and the edge of the strap; when the positioning element is located in the limiting hole, the anti-slip section is located at an arc-shaped inner wall of the bracket, thereby increasing the friction of the tightening.

Accordingly, the protection sheath for portable electronic device of the present invention uses the elastic protection sheath to be stretched and expanded to be placed on the portable electronic device to achieve the convenience of fixation and use. Then the connecting accessory and the strap are used to mount and wrap around a carrier, such as a rod of a motorcycle or bicycle, which increases the convenience of fastening. The elastic protection sheath and the connecting accessory can also be rotated with respect to each other to adjust the viewing position of the portable electronic device, so as to meet the need for easy operation and convenience.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
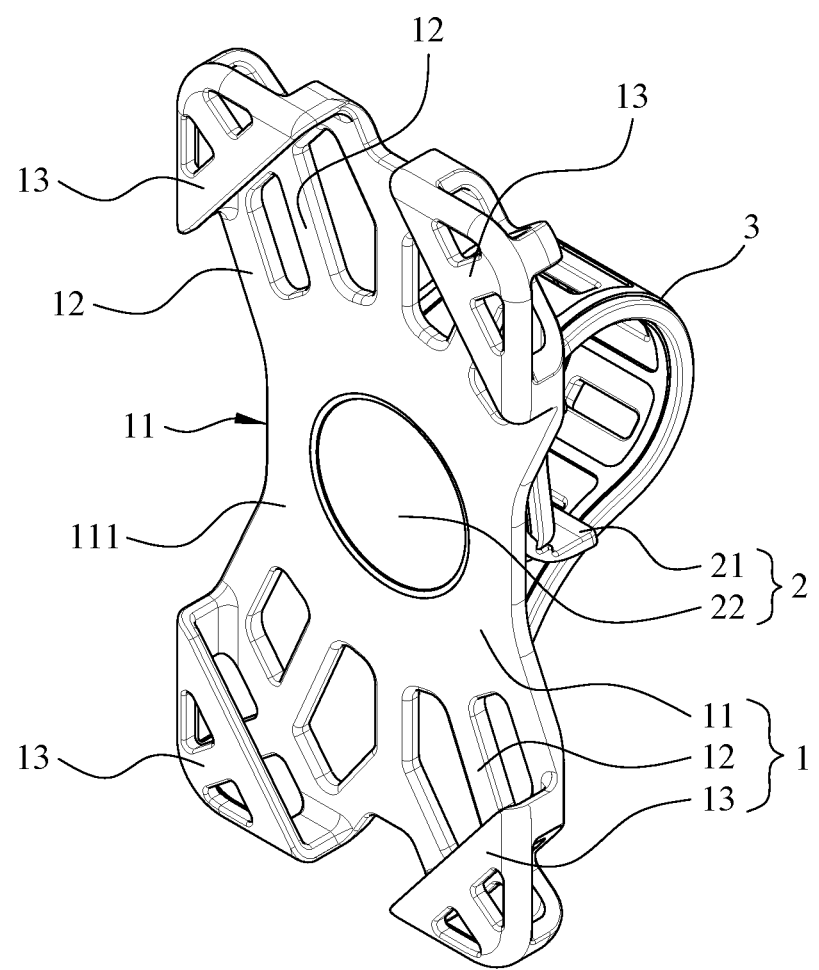
FIG. 1 is a perspective view of a fastening device with protection sheath for portable electronic device according to an embodiment of the present invention.

FIG. 1 is a perspective view of a fastening device with protection sheath for portable electronic device according to an embodiment of the present invention. The fastening device with protection sheath for the portable electronic device of the present invention includes an elastic protection sheath 1, a connecting accessory 2 and a strap 3.

Figure 2:
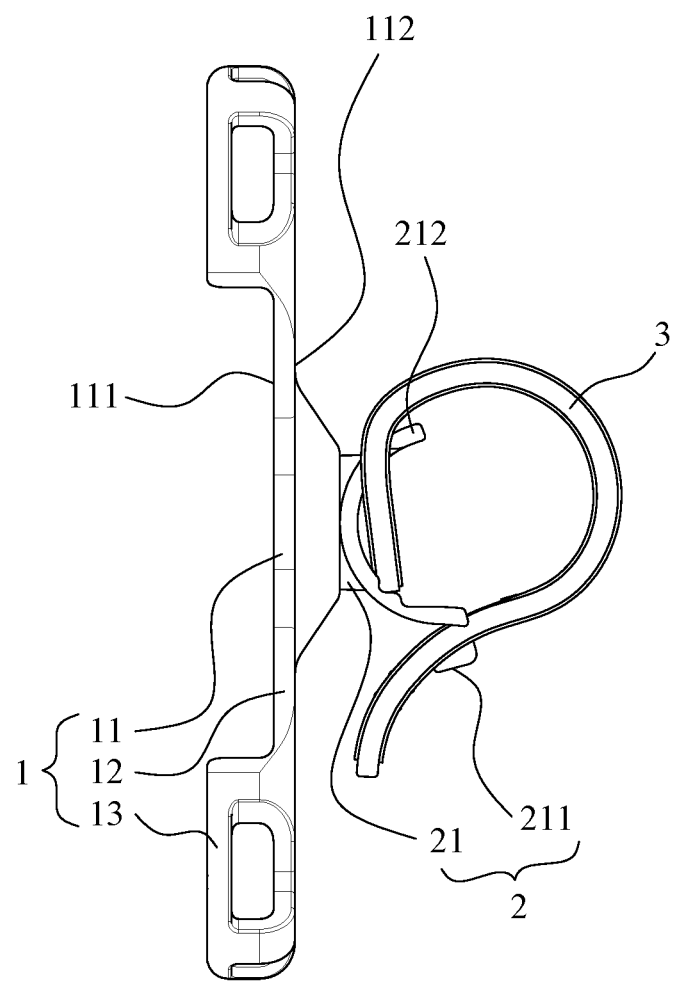
FIG. 2 is a side view of a fastening device with protection sheath for portable electronic device according to an embodiment of the present invention.

The following described the components of the present invention in details, as shown in FIG. 1 and FIG. 2.

The elastic protection sheath 1 has elasticity and can be stretched to increase the size when accommodating electronic device. In the present embodiment, the elastic protection sheath 1 is integrally formed of a silicone material, and includes a supporting area 11, a plurality of elastic strips 12 and a plurality of corner protection nets 13. The supporting area 11 has a first surface 111 and a second surface 112, opposite to each other. The first surface 111 is for placing a portable electronic device. The second surface 112 is partially protruding, for the connecting accessory 2 to be installed on the second surface 112. The supporting area 11 is connected to the corresponding corner protection net 13 via a plurality of elastic strips 12 respectively. In the present embodiment, the elastic strip 12 is in a strip shape, however, the elastic strip 12 can also be in the form of a net, which has elasticity and can be lengthened by stretching. The corner protection net 13 is in a three-dimensional triangular net shape and protrudes from the first surface 111. The corner protection net 13 also has elasticity and can be stretched to expansion. In the present embodiment, there are four corner protection nets 13, which are distributed symmetrically at the four corners around the supporting area 11. The portable electronic device can be a mobile phone with four corners. When the portable electronic device is to be fixed, the elastic strips 12 and the corner protection nets 13 are stretched, and the corner protection nets 13 are placed around each respective corner, the restoring force of the elastic strips 12 is used to maintain the tightness when fixed, and because the elastic strips 12 and the corner protection nets 13 are stretchable, the applicable size range can be increased and is suitable for various current mobile phones.

Figure 3:
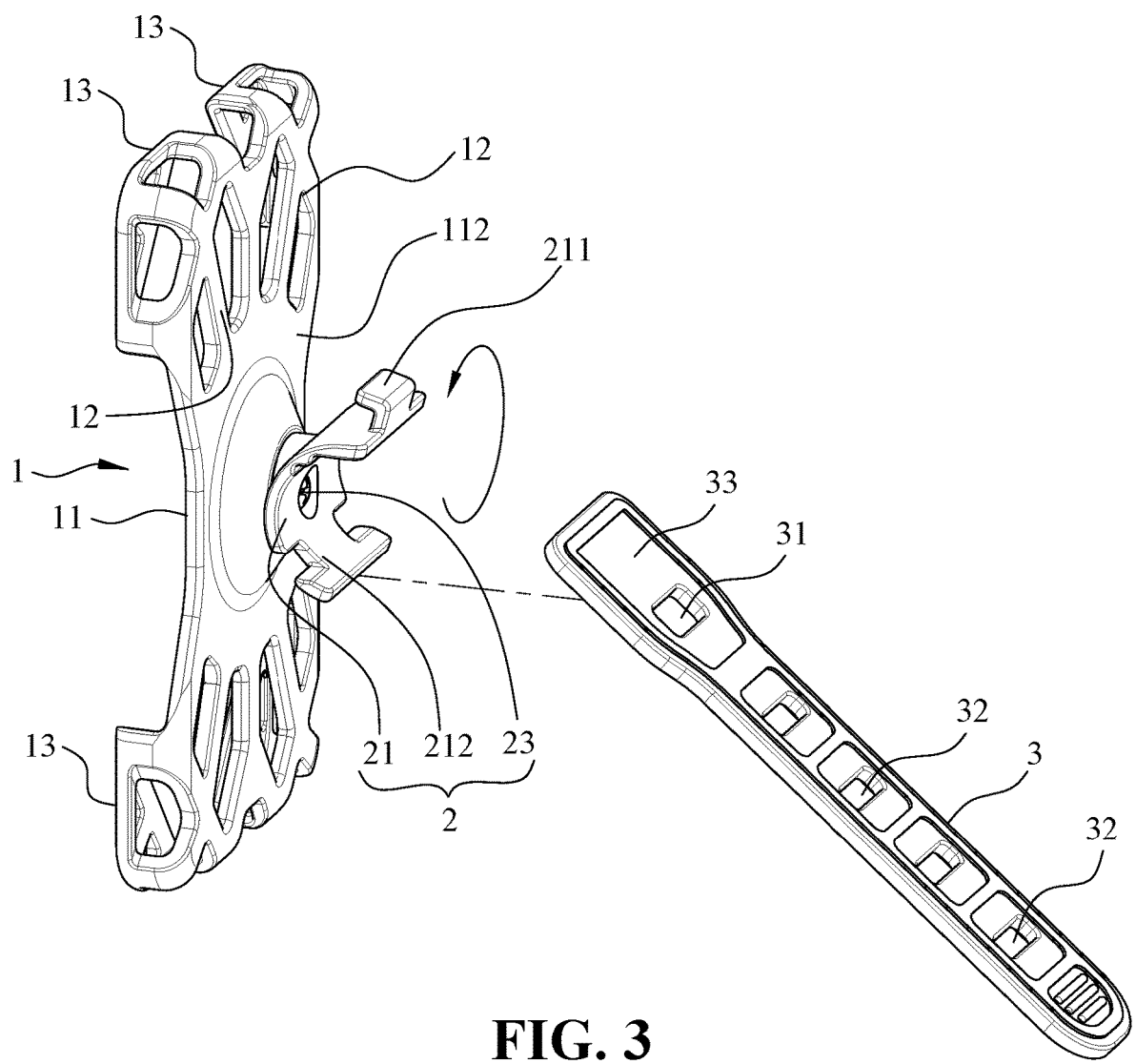
FIG. 3 is an exploded view of partial components of a fastening device with protection sheath for portable electronic device according to an embodiment of the present invention.
Figure 4:
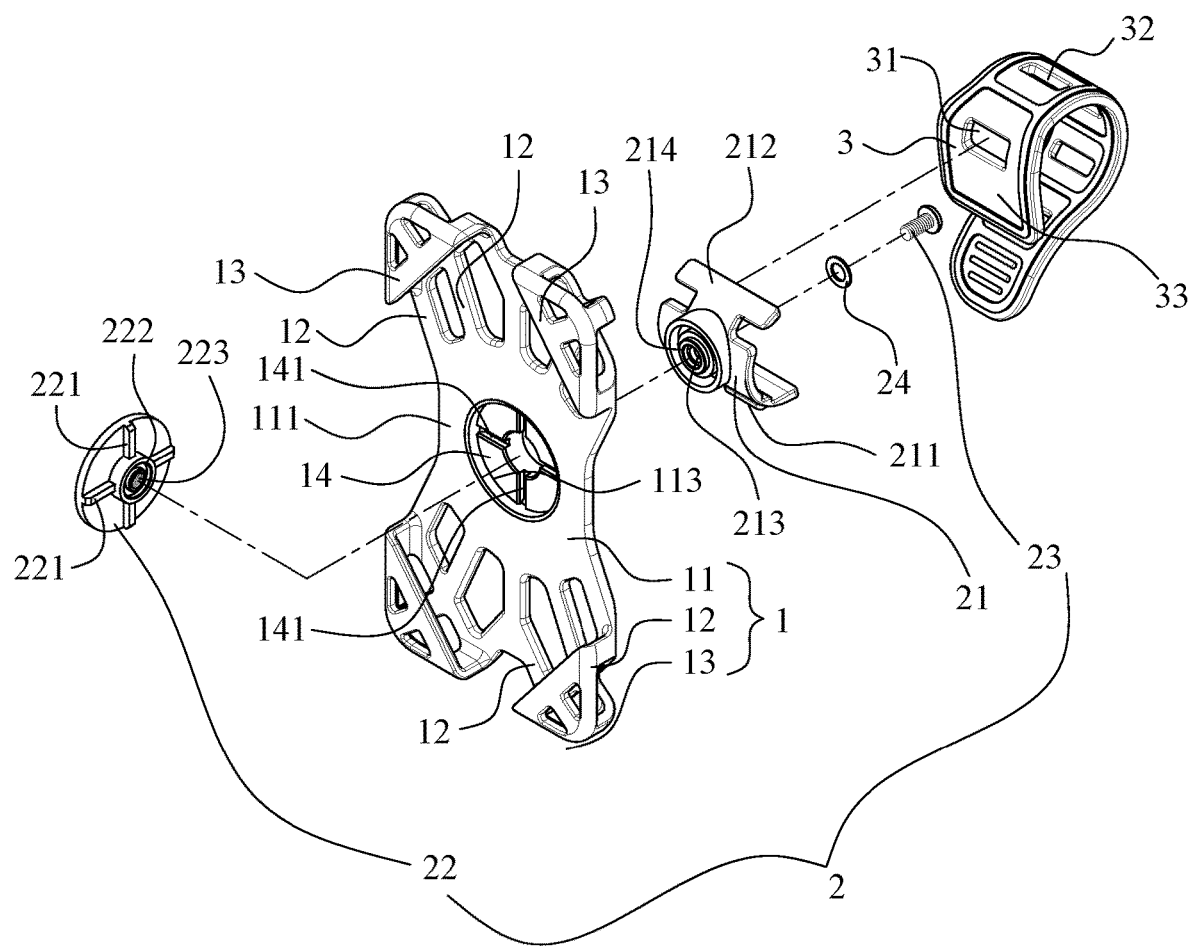
FIG. 4 is an exploded view of a fastening device with protection sheath for portable electronic device according to an embodiment of the present invention.

As shown in FIGS. 3 and 4, the connecting accessory 2 is installed on the elastic sheath 1 and protrudes from the second surface 112. The connecting accessory 2 is provided with a rotatable bracket 21. The bracket 21 is arc-shaped and has a protruding hook 211 at one end of the arc and a positioning element 212 at the other end of the arc. The positioning element 212 is T-shaped. The protruding hook 211 is an outwardly upside-down hook, which is designed for fixing the strap 3 around the protruding hook 211.

In the present embodiment, to facilitate assembly of the connecting accessory 2 and enable the bracket 21 to rotate, the supporting area 11 has a first hole 113, and the bracket 21 has a second hole 213 in the middle position. The connecting accessory 2 also includes an embedding element 22 and a locking element 23. The locking element 23 is a screw, and a pad 24 can be used in conjunction. When assembling, the embedding element 22 and the bracket 21 are respectively located on the first surface 111 and the second surface 112 of the supporting area 11, and the locking element 23 is locked onto the embedding element 22 through the second hole 213 and the first hole 113. Although the position of the bracket 21 is restricted by the locking element 23, the bracket 21 is not hindered from rotating.

For more aesthetic result after assembly, the supporting area 11 further forms a recess 14 on the inner side of the first surface 111, and a plurality of recessed limiting grooves 141 is further formed in the recess 14. The size and shape of the recess 14 correspond to the embedding element 22. The embedding element 22 is in the shape of a disc, and protrudes in a direction towards the bracket 21 with a plurality of ribs 221 and a docking portion 222. The docking portion 222 has a screw hole 223 at the center. When assembling, the ribs 221 are located in the limiting grooves 141 so that the embedding element 22 and the elastic sheath 1 act in synchronicity.

The bracket 21 further includes a shaft 214 facing the direction of the elastic sheath 1, and the second hole 213 penetrates the center of the shaft 14. When assembling, the docking portion 222 is docked with the shaft 214, and the locking element 23 is fastened to the screw hole 223 through the second hole 213 and the first hole 113, so that the bracket 21 can rotate without disengaging from the embedding element 22 and the elastic sheath 1.

The strap 3 has elasticity and can be stretched to expand. The strap 3 is made of a soft rubber material, which can increase the friction when tightened. The strap 3 has a limiting hole 31 and a plurality of buckle holes 32. The plurality of buckle holes 32 are arranged at equal intervals. When assembling, the limiting hole 31 of the strap 3 can be stretched and placed over the neck of the positioning element 212, then the protruding hook 211 is inserted into one of the buckle holes 32, and the bracket 21 and the strap 3 are wrapped and tightened onto a carrier to be fixed to accomplish quick fastening. The carrier can be a round rod on a bicycle or a motorcycle, or other round rods to be fixed.

In addition, the strap 3 has an anti-slip section 33 located between the limiting hole 31 and the edge of the strap 3. The anti-slip section 33 is a section far away from where the buckle holes 32 are located. When the positioning element 212 is located in the limiting hole 31, the anti-slip section 33 is located in the arc-shaped inner wall of the arc-shaped bracket 21. When tightened, the strap 3 is wrapped around the periphery of the carrier, thereby increasing friction and tightness. As can be seen from FIGS. 4 and 6, one side of the anti-slip section 33 is pressed by the carrier and the other side of the anti-slip section 33 covers the second hole 213 and the locking element 23 and presses across the second hole 213 on the arc-shaped inner wall, thereby increasing the friction of wrapping and tightening around the carrier.

Figure 5:
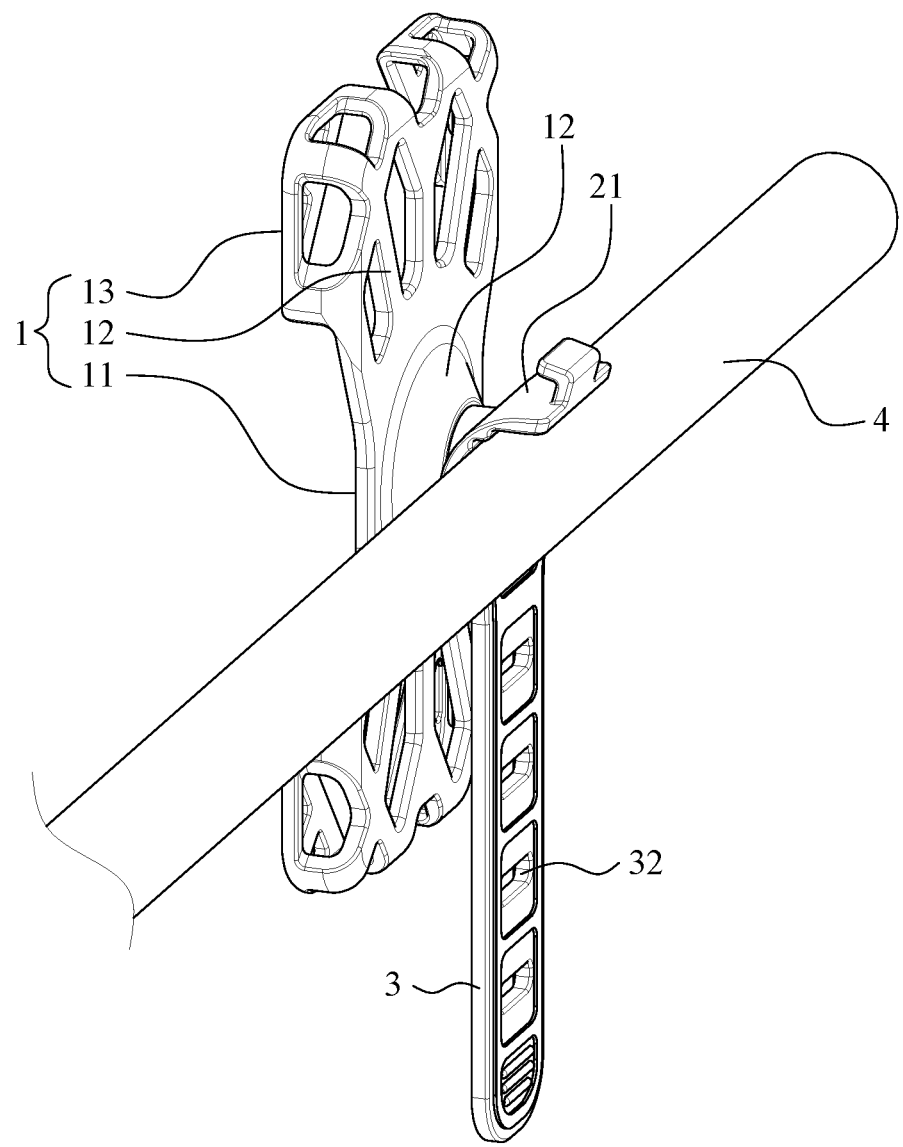
FIG. 5 is a perspective view of a fastening device with protection sheath for portable electronic device according to an embodiment of the present invention prepared to be mounted on a carrier.
Figure 6:
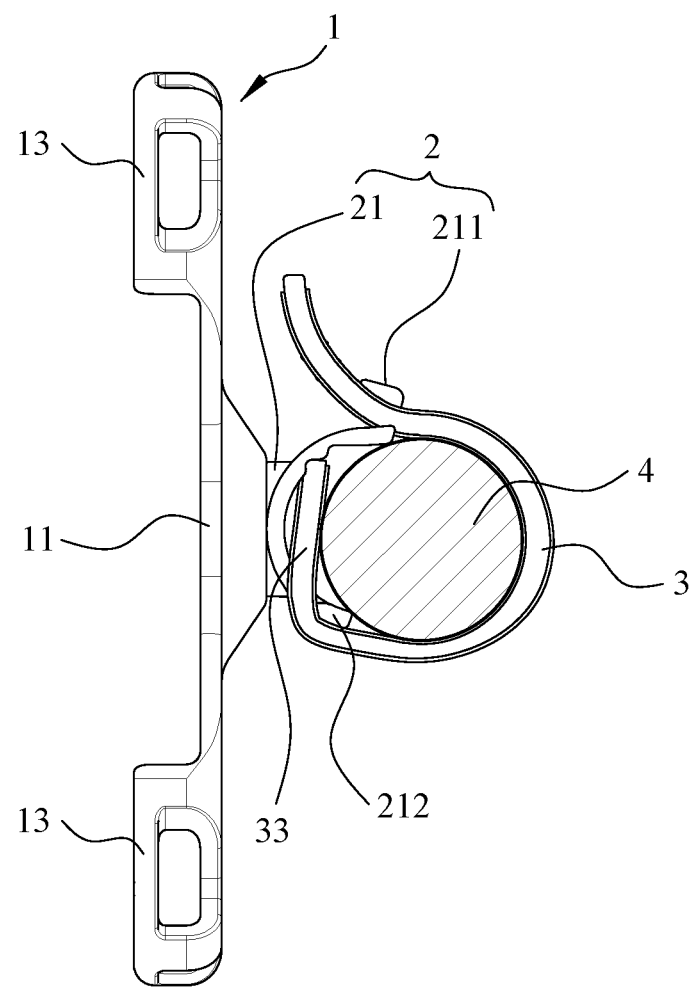
FIG. 6 is a side view of a fastening device with protection sheath for portable electronic device according to an embodiment of the present invention mounted on a carrier.
Figure 7:
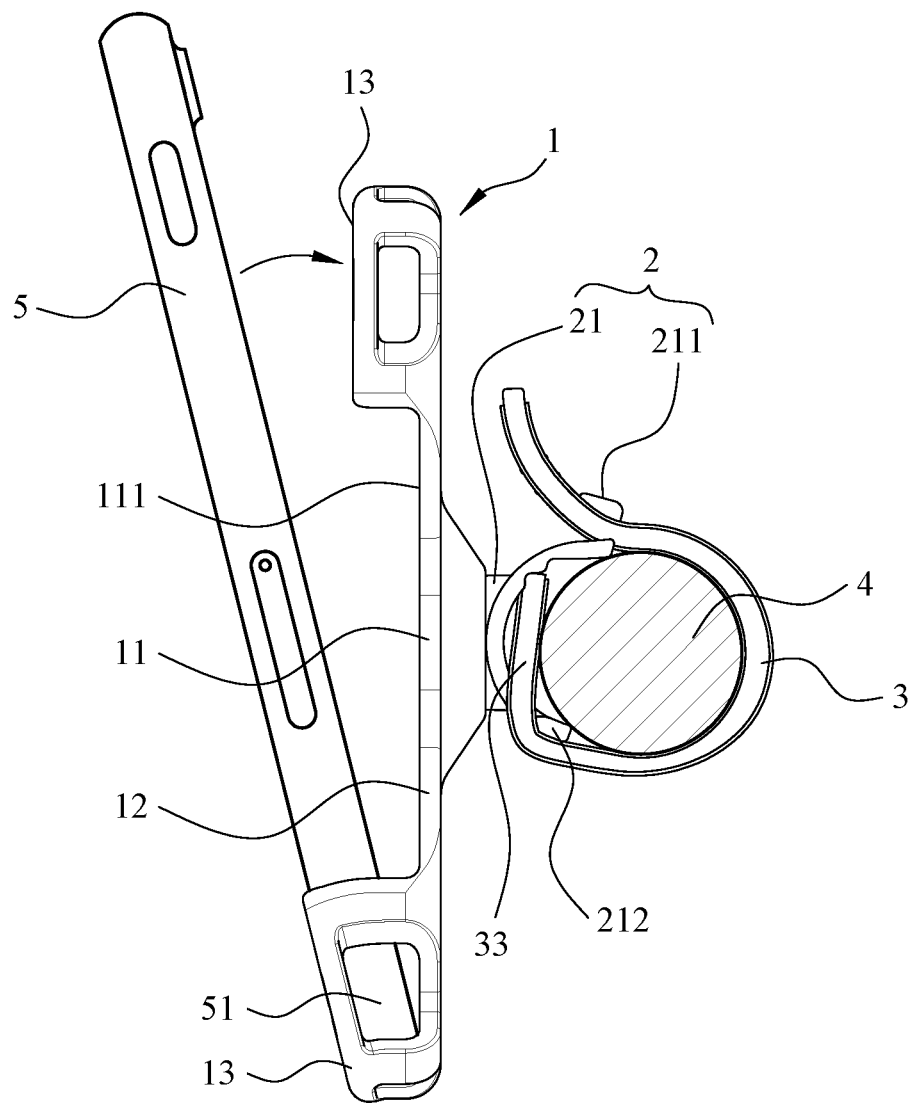
FIG. 7 is a perspective view of operating a portable electronic device fixed by a fastening device with protection sheath for portable electronic device according to an embodiment of the present invention.
Figure 8:
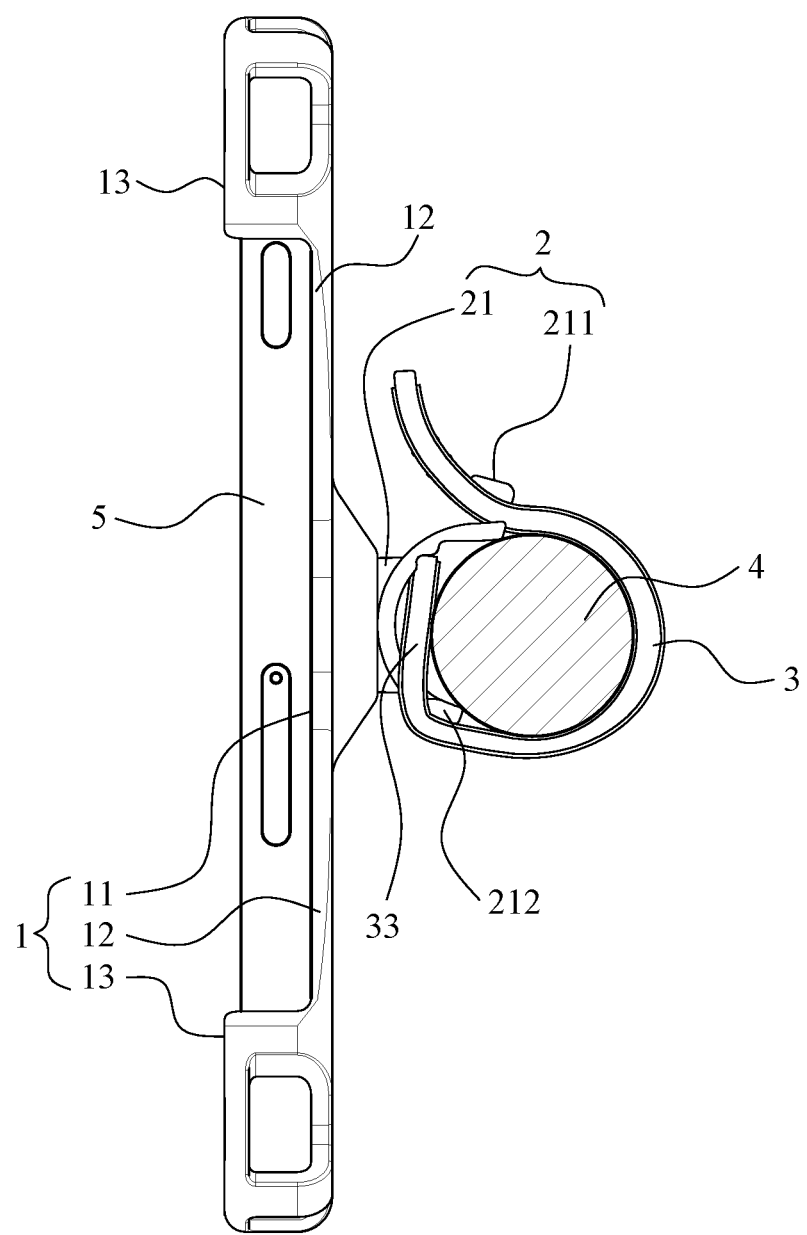
FIG. 8 is a perspective view of a fastening device with protection sheath for portable electronic device according to an embodiment of the present invention fixing a portable electronic device.

As shown in FIGS. 5 and 6, the inner wall of the arc-shaped bracket 21 is for placing a carrier 4, and the carrier 4 can be a circular rod on a bicycle or a motorcycle. Then, the protruding hook 211 is inserted into one of the buckle holes 32 to wrap the strap 3 around the periphery of the carrier 4 to accomplish fixing. As shown in FIGS. 7 and 8, the portable electronic device 5 is a mobile phone. There are four corners 51 around the portable electronic device 5, and the elastic protection sheath 12 and the two lower corner protection nets 13 are stretched and sheathed over the two lower corners 51, and then the two upper corner protection nets 13 are stretched and sheathed over the two upper corners 51, so that the position of the portable electronic device 5 is fixed inside the elastic protection sheath. Comparing FIG. 8 and FIG. 7, it is clearly seen that the elastic protection sheath 1 in FIG. 8 is enlarged due to stretching so that the tightness can firmly hold the portable electronic device 5, as well as expanded and applied to more portable electronic device 5 of different sizes. In addition, the bracket 21 can be rotated with respect to the elastic protection sheath 1. When the bracket 21 is fixed to the carrier 4, the elastic protection sheath 1 can be rotated to allow the user to adjust the viewing angle of portable electronic device 5 fixed by the elastic protection sheath 1 for more convenient viewing.

In summary, the fastening fixing device with protection sheath for portable electronic device of the present invention stretches the elastic protection sheath 1 to expand and then places onto the portable electronic device to achieve the convenient fixing and use. The connecting accessory 2 and the strap 3 are used to wrap around a carrier such as a motorcycle or bicycle to accomplish firm and convenient fixation. The elastic protection sheath 1 and the connecting accessory 2 can also be rotated relatively to each other to adjust the viewing position of the portable electronic device so as to meet the need for convenient installation and ease of use, and meet the requirements of a patent application.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A fastening device with a protection sheath for a portable electronic device, comprising: an elastic protection sheath, a connecting accessory and a strap;

the elastic protection sheath being stretchable to increase an accommodation size, and comprising a supporting area, a plurality of elastic strips and a plurality of corner protection nets, all formed monolithically; the supporting area having a first surface and a second surface, opposite to each other; the first surface being for placing a portable electronic device, the corner protection nets being connected to the supporting area through elastic strips, the corner protection nets buckling on four corners of the portable electronic device with a tightness maintained by the elastic strips when fastened;

the connecting accessory being disposed on the elastic protection sheath and located on the second surface, the connecting accessory being disposed with a rotatable arc-shaped bracket with a protruding hook and a positioning element disposed respectively at two ends of the rotatable arc-shaped bracket, the connecting accessory further including an embedding element and a locking element, the embedding element and the rotatable arc-shaped bracket being respectively located on the first surface and the second surface of the supporting area; and the strap being elastic and stretchable, and having a limiting hole, an anti-slip section located between the limiting hole and an edge of the strap, and a plurality of buckle holes, the strap being sheathed on the positioning element by the limiting hole and the protruding hook being inserted into one of the buckle holes, the rotatable arc-shaped bracket and the strap being used to wrap and tighten around a carrier to be fastened to;

wherein the supporting area has a first hole, a middle position of the rotatable arc-shaped bracket has a second hole, the locking element is locked to the embedding element through the second hole and the first hole, and when the positioning element is located in the limiting hole and the carrier is fastened by the strap, a first side of the anti-slip section is pressed by the carrier, and a second side of the anti-slip section covers the second hole and the locking element and presses across the second hole on an arc-shaped inner wall of the rotatable arc-shaped bracket, thereby increasing friction of wrapping and tightening around the carrier.

2. The fastening device with a protection sheath fora portable electronic device according to claim 1, wherein the supporting area further forms a recess at the first surface, the embedding element is disposed in the recess, and the first hole penetrates the recess.

3. The fastening device with a protection sheath fora portable electronic device according to claim 2, wherein the recess is further formed with a plurality of recessed limiting grooves, the embedding element has a plurality of convex ribs facing the recess, and the convex ribs are located in the limiting grooves after assembly.

4. The fastening device with a protection sheath fora portable electronic device according to claim 1, wherein the embedding element has a docking portion formed with a screw hole, the rotatable arc-shaped bracket has a shaft with a center, and the second hole penetrates the center of the shaft, the docking portion is docked with the shaft when assembled, and the locking element is a screw that passes through the second hole and then locks in the screw hole, so that the rotatable arc-shaped bracket can be rotated but not separated from the embedding element.

5. The fastening device with a protection sheath fora portable electronic device according to claim 1, wherein each of the elastic strips is in the shape of a strip or a net.

* * * * *